June 12, 1956  J. R. HOLLINS  2,750,468
DIRECTION SIGNALLING SYSTEMS
Filed June 29, 1953  2 Sheets-Sheet 1

INVENTOR
Jesse R Hollins
BY
ATTORNEY

June 12, 1956 J. R. HOLLINS 2,750,468
DIRECTION SIGNALLING SYSTEMS
Filed June 29, 1953 2 Sheets-Sheet 2

INVENTOR
Jesse R. Hollins
BY
his ATTORNEY

United States Patent Office 2,750,468
Patented June 12, 1956

2,750,468

DIRECTION SIGNALLING SYSTEMS

Jesse R. Hollins, Brooklyn, N. Y.

Application June 29, 1953, Serial No. 364,801

3 Claims. (Cl. 200—116)

This invention relates to direction signalling systems for vehicles and, more particularly, to a novel signalling system of this type in which operation of timing means controlling cancellation of a direction signal is dependent upon a pre-selected operating position of one of the pedals or other elements controlling movement of the vehicle.

To this end, the invention arrangement comprises a signalling system in which operation of the timer effected cancellation means is made dependent upon the motion of the vehicle. Thus, if the turning movement is delayed by approaching or cross traffic, for example, the operating cycle of the timer is interrupted until the vehicle is in motion to take the intended turn. More specifically, operation of the timing means is made dependent upon whether or not one of the motion controlling pedals or other elements of the vehicle, such as the accelerator, brake, or clutch pedal, is in the position it occupies when the vehicle is in motion.

For an understanding of the invention principles, reference is made to the following description of typical embodiments there as illustrated in the accompanying drawing.

The invention signalling arrangement includes a selector switch operator having cam means engaged by a thermostatically operated latch in either selective signalling position of the switch. When the latch is engaged with the cam means due to manual setting of the selector switch operator, an electric heating circuit for the thermostatically operated latch is closed and, after a predetermined heating interval, the latch releases the cam means so that self-restoring means, such as springs, will return the switch to neutral to cancel the signal indication.

To make operation of the cancellation feature dependent upon vehicle motion, the heating circuit has included therein a switch controlled by the accelerator, brake, or clutch pedal of the vehicle. This switch is closed if its controlling pedal is in the position occupied during motion of the vehicle, and is opened when its controlling pedal is in the position occupied when the vehicle is halted. Thus, heating of the thermostatic element is interrupted or prevented unless the controlling pedal is operated to position effecting or permitting motion of the vehicle.

Figure 1:
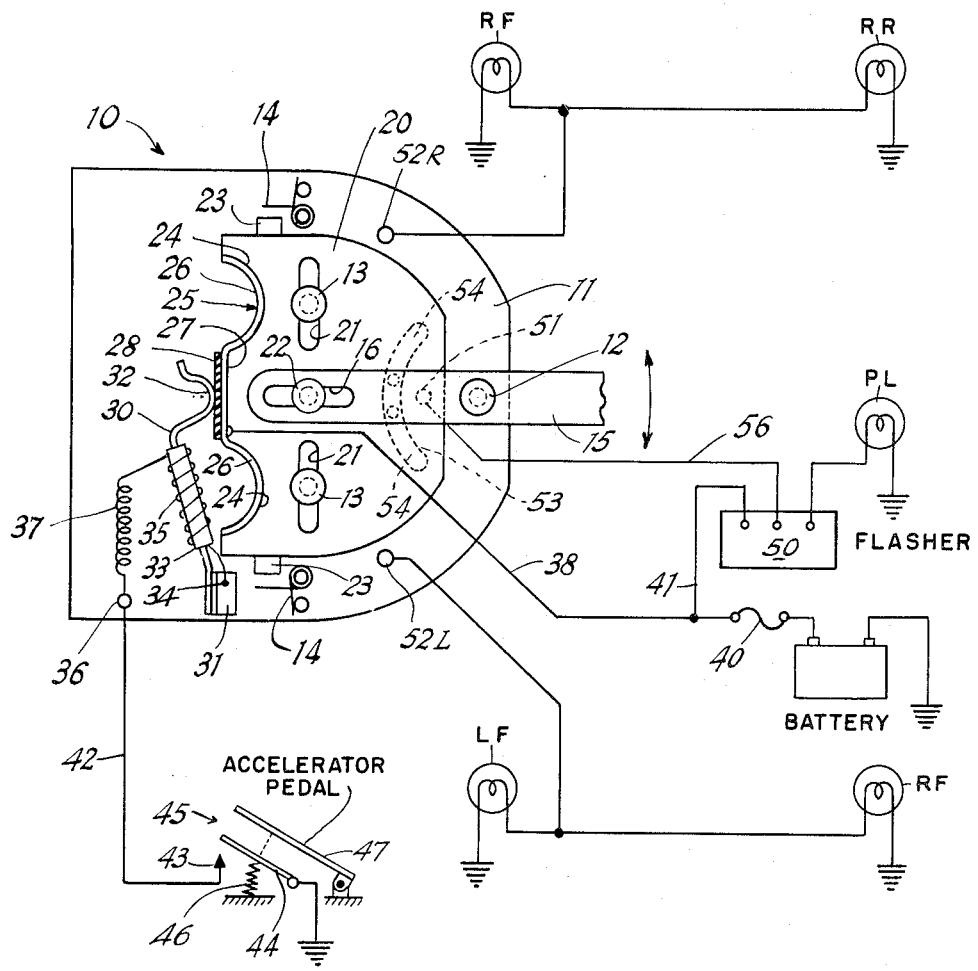
Fig. 1 is a partially schematic plan view of one form of selector switch operator and automatic cancelling means embodying the invention.

Referring to Fig. 1, a selector switch 10 incorporating the invention is illustrated as including a preferably dielectric base 11 on which is pivotally mounted, as at 12, a switch operating lever 15. Lever 15 is arranged to operate a cam slide 20 from the neutral or "cancelled" position shown to either of a pair of signalling positions.

The cam slide 20 is formed with longitudinally spaced and aligned rectilinear slots 21, 21 each receiving a guide pin 13 on base 11. Between slots 21, 21, slide 20 carries a pin 22 projecting into an elongated slot 16 adjacent the inner end of lever 15. Centering springs 14, 14 on base 11 are cooperable with abutments 23, 23 on slide 20 to engage these abutments, when slide 20 is moved outwardly by operation of lever 15, to bias the slide toward the illustrated position.

Along its left edge, as received in Fig. 1, cam slide 20 is formed with spaced, substantially arcuate notches or recesses 24, 24 which serve to position a conductive contact member 25 having bowed end portions 26, 26 fitting in notches 24, 24 and joined by a central section 27. For a purpose to be described hereinafter, central section 27 is covered by an overlying dielectric strip 28.

The timing means controlling automatic cancellation of switch 10 comprises a bi-metallic latch member 30 having one end secured in electrically conductive relation to an electrically conductive mounting block 31 on base 11. The free end of member 30 is formed with an arcuately bowed latch portion 32 designed to closely fit in either of the recesses formed by end portions 26 of conductive member 25. In the illustrated position of switch 10, latch portion 32 is engaged with dielectric strip 28, bending latch member 30 outwardly from the position it normally would occupy, when cold, if not thus restrained.

A dielectric wrapping or sleeve 33 embraces member 30 between its ends. On this sleeve is wound a heating winding or coil 35 for member 30, coil 35 having one end soldered or otherwise electrically connected to block 31 at 34, and its other end connected to a terminal or binding post 36 by a flexible lead 37.

In accordance with the invention, the conductive strip 25 is connected to the vehicle source of electric energy, such as the battery and generator. For this purpose, a conductor 38 has one end soldered or otherwise electrically connected to strip 25 and its other end connected to a fuse 40. As indicated, fuse 40 is connected to the battery generator circuit or to the live terminal of the ignition switch. A conductor 41, also connected at one end through fuse 40 to the vehicle electric system, is connected through flasher 50 to the signal circuit controlling contacts of switch 10. These contacts include an intermediate contact 51 on base 11 beneath slide 20, and a pair of contacts 52R and 52L spaced on either side of and aligned with contact 51. A C-shaped bridging contact 53 is secured to the underside of slide 20 and has spaced outwardly projecting arms 54, 54. Contact 51 is connected to flasher 50 by conductor 56. The third terminal of the flsher is the relay terminal connected to grounded pilot lamp PL. Contact 52R is connected in parallel to right front and right rear signal lamps RF and RR. Contact 52L is connected to left front and left rear signal lamps LF and LR.

When lever 15 is operated to signal a right turn, slide 20 is moved upwardly, and arms 54 of contact 53 engage and interconnect contacts 51 and 52R, thus connecting the right signal lamps RF and RR to flasher 50. A corresponding operation of left lamps LF and RF to flasher 20 is effected by control 53 when lever 15 moves slide 20 downwardly to signal a left turn. Whenever either set of signal lamps is energized, pilot lamp PL is flashed by flasher 50.

A conductor 42 connects terminal 36 to the front contact 43 of a switch 45 having a grounded arm 44 normally biased to the open position by a spring 46. Arm 44 is mechanically linked to the vehicle accelerator or fuel feed pedal 47 so that switch 45 is closed whenever pedal 47 is depressed to feed fuel to the engine. Thus, switch 45 is closed whenever pedal 47 is in a position normally resulting in motion of the vehicle over the ground.

The invention selective automatic cancelling arrangement operates in the following manner. Normally, with switch in initial position bight 32 of bi-metallic member engages dielectric strip 28, so that no current flows through heating coil 35. However, when lever 15 is operated to signal a proposed change in direction of the vehicle, slide 20 is moved up or down, as viewed in Fig. 1, and latch bight 32 snaps into a recess 26 of conductive strip 25, thus releasably latching the slide in the operated position. As a result, member 30 is electrically connected to fuse 40 through conductive strip 25 and conductor 38. Consequently, point 34 is also connected to fuse 40 and, if switch 45 is closed, heating coil 35 is energized over a circuit including fuse 40, conductor 38, strip 25, member 30, block 31, point 34, coil 35, conductor 37, terminal 36, conductor 42, switch 45 and ground.

Under these conditions, which prevails when pedal 47 is under foot pressure and is feeding fuel to the vehicle engine, coil 35 heats member 30 and, after a pre-set interval determinable by circuit design considerations, member 30 is heated sufficiently to bow away from slide 20, thus reducing pressure against slide 20. This reduced pressure of member 30 against slide 20 releases bight latch 32 from a notch 26 and allows springs 14 to restore slide 20 to the neutral position where bight 32 engages dielectric strip 28, interrupting the energization of heating coil 35. The direction signal is thereby cancelled at the end of a predetermined time interval.

Now assume that the vehicle is halted at a traffic light after selector switch has been operated to signal a proposed turn. Accelerator pedal 47 will be released, opening switch 45 and thus interrupting energization of heating coil 35. Consequently, member 30 cools off and remains in the latching position until pedal 47 is depressed to set the vehicle in motion. The time switch 10 is held before automatic cancellation is thus tolled from the start of vehicle motion. The same condition occurs if pedal 47 is released, to halt the vehicle, at the time switch 10 is operated. The timed releasing operation of latch 30 will not be started until pedal 47 is again depressed to initiate vehicle motion.

Figure 2:
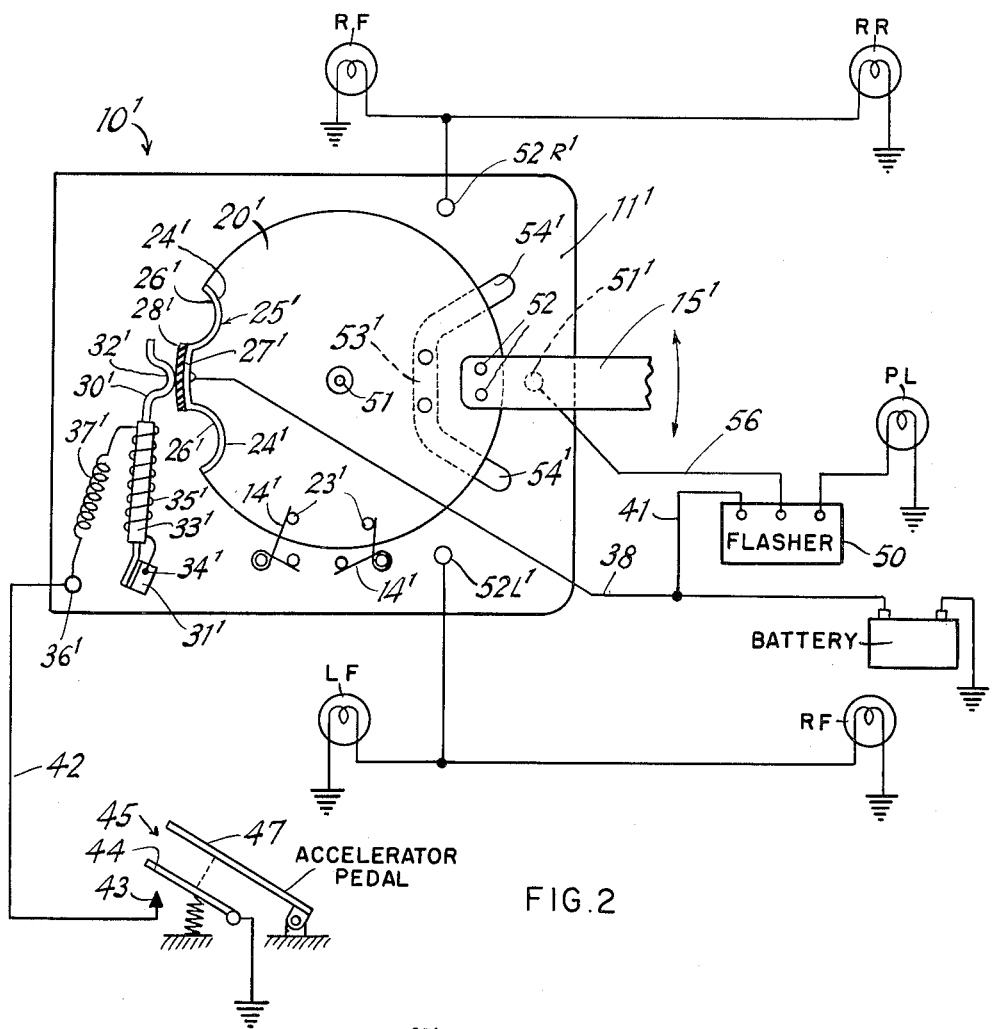
Fig. 2 is a similar view of a preferred embodiment.

Fig. 2 illustrates a preferred embodiment of the invention involving a cylindrical cam slide 20' rotatably mounted on the dielectric switch base. In this embodiment, parts identical to those of Fig. 1 have been given the same reference numerals, and corresponding parts have been given the same reference numerals primed.

In this case, cam slide 20' has a circular periphery arcuately notched at 24', 24' to receive bights 26', 26' of conductive strip 25'. Slide 20' is rotatably mounted on base 11 at 51, and operating lever 15' is rigidly secured to the slide as at 52. Centering springs 14', 14' cooperate with pins 23', 23' on cam 20' to bias this cam to the neutral or central position in which bight 32' is engaged with dielectric strip 28'.

On its under surface, cam 20' carries a U-shaped contact member 53' having fingers 54', 54' projecting beyond the cam circumference for selective connection of a contact 51' on base 11' to either of a pair of contacts 52R' or 52L' on base 11'. In the same manner as in Fig. 1, contact 51' connected by conductor 56' to flasher 50, contact 52R' is connected to the right signal lamps RF and RR, and contact 52L' is connected to the left signal lamps LF and LR.

To signal a right turn lever 15' and disc 20' are swung counter-clockwise until bight 32' snaps into the upper recess 26', with contact member 53' interconnecting contacts 51' and 52R'. The right hand lamps RF and RR are thus flashed by flasher 50, which also flashes pilot lamps PL. Coil 35' is energized as follows: if accelerator pedal 47 is depressed to effect car movement and close switch 45; battery, conductor 38, strip 25, latch 32', arm 30', point 34', block 31', coil 35', conductor 37', terminal 36', conductor 42, switch 45 and ground. After a predetermined heating time, arm 30' bows out, releasing latch 32' from recess 26', and centering springs restore disc 20' to neutral as shown. This brakes the signal, circuits and the heating circuit for coil 35', allowing arm 30' to cool and return to its "ready" latch position.

Should accelerator pedal 47 be released, as when the vehicle is halted at an intersection before making the signalled turn, switch 45 is opened to break the heating circuit for coil 35'. Thus the timing cycle is interrupted until the accelerator pedal is again depressed to start the car moving. During this interruption, disc 20 remains in the latched signalling position.

Figure 3:
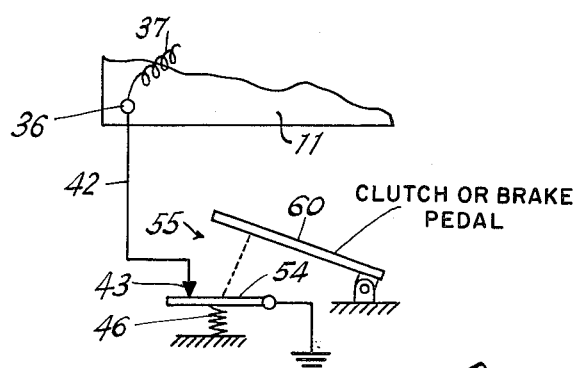
Fig. 3 is a view of a portion of Figs. 1 and 2 illustrating a modification of the vehicle motion control of the timer effected cancellation means.

Control of the initiation of the timing period before cancellation need not necessarily be effected by the vehicle fuel feed or accelerator pedal, but can be effected by any other pedal or the like controlling vehicle motion, such as the foot brake pedal or the clutch pedal. Fig. 3 shows an arrangement wherein the brake pedal controls the start of the timing period, and the same arrangement is equally applicable to the clutch pedal.

Referring to Fig. 3, normally open switch 45 is replaced by a normally closed switch 55 having a front contact 53 connected to terminal 36 by conductor 42, and a grounded arm 54 biased to the closed position by spring 46. Switch 55 is mechanically linked to brake pedal 60 so that it is opened, to interrupt the timer energizing circuit, whenever pedal 60 is depressed to arrest vehicle motion. When the brake is released to allow vehicle motion, switch 55 recloses to complete the timer energization circuit.

While a specific embodiment of the invention has been shown and described in detail to illustrate the application of the invention principles, it will be understood that the invention may be embodied otherwise without departing from such principles.

What is claimed is:

1. An automatically latched selector switch including a base; a slide movably mounted on said base and having a pair of longitudinally spaced recesses in an edge thereof, said slide being movable from a neutral position to either of a pair of operated positions; means biasing said slide to the neutral position; a conductive strip having latch portions embraced in said recesses and a connecting portion extending along such edges; a dielectric strip overlying said connecting portion; a bi-metallic arm mounted on said base and having electrically conductive latch means on its free end normally pressed against said dielectric strip and engageable in either of said latch portions to releasably latch said slide in either operated position; an intermediate contact and a pair of end contacts mounted on said base; a circuit closer on said slide operable, in either operated position of the latter, to connect an end contact to said intermediate contact; a heating coil for said bi-metallic arm having one end electrically connected to said arm; a first terminal on said switch connected to the other end of said heating coil; and a second terminal on said switch connected to the other end of said heating coil; said arm being operable, after a predetermined period of heating thereof by said coil, to disengage said latch means from the latch portion to provide for said biasing means to restore said slide to the neutral position.

2. A selector switch including a base; a slide movably mounted on said base and having an edge, said slide being movable from a neutral position to either of a pair of operated positions to selectively provide a signal indication; means biasing said slide to the neutral position; a conductive strip on said slide having latch portions and a connecting portion extending along such edge; a dielectric strip overlying said connecting portion; a bi-metallic arm mounted on said base and having electrically conductive latch means on its free end normally pressed against dielectric strip and engageable in either of said latch portions to releasably latch said slide in either operated position; an intermediate contact and a pair of end contacts mounted on said base; a circuit closer on said slide operable, in either operated position of the latter, to connect an end contact to said intermediate contact; a heating coil for said bimetallic arm having one end electrically connected to said arm; a first terminal said switch connected to said conductive strip; and a second terminal on said switch connected to the other end of said heating coil; said arm being operable, after a predetermined period of heating thereof by said coil, to disengage said latch means from the latch portion to provide for said biasing means to restore said slide to the neutral position.

3. A selector switch including a base; a circular slide oscillatably mounted on said base, said slide being movable from a neutral position to either of a pair of operated positions to selectively provide a signal indication; means biasing said slide to the neutral position; a conductive strip on said slide having latch portions and a connecting portion extending along the periphery of said slide; a dielectric strip overlying said connecting portion; a bi-metallic arm mounted on said base and having electrically conductive latch means on its free end normally pressed against said dielectric strip and engageable in either of said latch portions to releasably latch said slide in either operated position; an intermediate contact and a pair of end contacts mounted on said base; a circuit closer on said slide operable, in either operated position of the latter, to connect and end contact to said intermediate contact; a heating coil for said bi-metallic arm having one end electrically conected to said arm; a first terminal on said switch connected to said conductive strip; and a second terminal on said switch connected to the other end of said heating coil; said arm being operable, after a predetermined period of heating thereof by said coil, to disengage said latch means from the latch portion to provide for said biasing means to restore said slide to the neutral position.

References Cited in the file of this patent

UNITED STATES PATENTS

| | | |
|---|---|---|
| 1,108,036 | Walsh | Aug. 18, 1914 |
| 1,530,641 | Bennett | Mar. 24, 1925 |
| 2,040,923 | Doane | May 19, 1936 |
| 2,308,097 | Murray | Jan. 12, 1943 |
| 2,411,702 | Wilbert | Nov. 26, 1946 |
| 2,657,293 | Hopkin | Oct. 27, 1953 |